United States Patent
Tanaka

(10) Patent No.: US 8,295,127 B2
(45) Date of Patent: Oct. 23, 2012

(54) COMMUNICATION APPARATUS

(75) Inventor: Akira Tanaka, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 778 days.

(21) Appl. No.: 12/167,308

(22) Filed: Jul. 3, 2008

(65) Prior Publication Data

US 2009/0016170 A1    Jan. 15, 2009

(30) Foreign Application Priority Data

Jul. 10, 2007  (JP) ................................ 2007-180908

(51) Int. Cl.
G04B 47/00 (2006.01)
G04C 3/00 (2006.01)
H04M 1/00 (2006.01)
H04B 1/38 (2006.01)

(52) U.S. Cl. ........ 368/47; 368/204; 455/556.1; 455/572

(58) Field of Classification Search ............... 368/10, 368/13, 47, 64, 66, 204; 455/556.1, 572–574; 342/357.74

See application file for complete search history.

(56) References Cited

U.S. PATENT DOCUMENTS

| | | | |
|---|---|---|---|
| 6,928,300 B1 * | 8/2005 | Skinner et al. | 455/556.2 |
| 7,075,859 B2 * | 7/2006 | Miyahara et al. | 368/47 |
| 7,092,925 B2 * | 8/2006 | Na et al. | 706/46 |
| 7,102,964 B2 * | 9/2006 | Fujisawa | 368/66 |
| 7,385,875 B2 * | 6/2008 | May et al. | 368/10 |
| 7,400,229 B2 * | 7/2008 | Boss et al. | 340/309.16 |
| 7,529,157 B2 * | 5/2009 | Nakagawa | 368/47 |
| 2002/0003751 A1 * | 1/2002 | Smith | 368/47 |
| 2004/0037172 A1 * | 2/2004 | Okeya | 368/204 |
| 2004/0266491 A1 * | 12/2004 | Howard et al. | 455/567 |
| 2005/0020301 A1 * | 1/2005 | Lee | 455/556.1 |
| 2005/0232086 A1 * | 10/2005 | Jiddou et al. | 368/47 |
| 2007/0060205 A1 * | 3/2007 | Kim | 455/566 |
| 2007/0223445 A1 | 9/2007 | Baek | |
| 2008/0112269 A1 * | 5/2008 | Lawton | 368/10 |
| 2008/0207263 A1 * | 8/2008 | May et al. | 455/556.2 |
| 2010/0225495 A1 * | 9/2010 | Marui | 340/635 |
| 2011/0029870 A1 * | 2/2011 | May et al. | 715/710 |

FOREIGN PATENT DOCUMENTS

| | | |
|---|---|---|
| EP | 1 307 063 A2 | 5/2003 |
| EP | 1 372 048 A2 | 12/2003 |
| EP | 1 544 697 A2 | 6/2005 |
| EP | 1 798 613 A1 | 6/2007 |
| JP | 2004-015713 A | 1/2004 |
| KR | 100678077 B1 | 1/2007 |

OTHER PUBLICATIONS

European Search Report dated Feb. 29, 2012 as received in application No. 08012281.5.

* cited by examiner

Primary Examiner — Vit W Miska
(74) Attorney, Agent, or Firm — Maschoff Gilmore & Israelsen

(57) ABSTRACT

A communication apparatus having a main battery for performing main operations of the communication apparatus so as to connect or remove from the device freely. The communication apparatus includes a clock unit and a control unit. The clock unit configured to count a current time by using power supplied by the main battery, and configured to acquire the current time from a base station based on the main battery was connected after the main battery was removed the communication apparatus. And the control unit configured to control so as to set the current time acquired by the clock unit as the current time counted.

14 Claims, 8 Drawing Sheets

30 schedule information

| item information | designated time information | alarm informaion | display content information | sound information | execution status information |
|---|---|---|---|---|---|
| wake-up | 6:00 | ON | Good morning | Ninth symphony | done |
| lunch | 12:00 | ON | picture 1 | alarm 1 | undone |
| conference | 13:30 | OFF | first meeting room | -- | undone |
| close of work | 17:00 | ON | Good work today | alarm 2 | undone |
| drinking session | 19:30 | OFF | usual spot | -- | undone |
| ... | ... | ... | ... | ... | ... |

Columns: 31, 32, 33, 34, 35, 36

Fig.3

COMMUNICATION APPARATUS

CROSS-REFERENCE TO RELATED APPLICATIONS

This application is based upon and claims the benefit of priority from the prior Japanese Patent Application No. 2007-180908 filed Jul. 10, 2007, the entire contents of which are incorporated herein by reference.

FIELD OF THE INVENTION

The present invention relates to a communication apparatus including only a main battery as a power supply source, particularly, relates to a communication apparatus setting the current time again when the main battery is connected.

DESCRIPTION OF THE BACKGROUND

Most of conventional communication apparatus are designed to have a main battery and a sub battery. In such communication apparatus, main operations of the communication apparatus is performed by the main battery, and operations of maintaining a memory, clocking time and the like are performed by the sub battery when the main battery of the communication apparatus is not operated. Since the communication apparatus is provided with plural batteries as described above, a clock can be operated by the sub battery even when the main battery is removed, therefore, the current time can be kept accurate.

However, to provide plural batteries on the communication apparatus increases size and weight of the device, further, requiring costs for mounting these batteries, therefore, it is preferable in some cases that only the main battery is mounted as the power supply source on the communication apparatus which is taken along as a mobile unit. For example, in JP-A-2004-15713, there is disclosed a communication apparatus which can correct time at any time by housing a radio controlled clock. In this communication apparatus, it is not necessary to mount a secondary battery by housing the radio controlled clock.

SUMMARY OF THE INVENTION

In the case of the communication apparatus including one battery, the main operation of the clock is performed by the main battery. Therefore, when the main battery is removed from the communication apparatus or when the power supply is cut due to low voltage of the main battery, the clock is not allowed to operate and the current time is initialized. In addition, when the main battery is connected after the current time is initialized, it is unable to set the accurate current time again and the initialized state is continued because the accurate current time is unclear even the clock is allowed to operate again. In this case, there is a problem that services using time such as a scheduler and the alarm become unavailable unless the user sets the current time again after turning on the power.

BRIEF DESCRIPTION OF THE DRAWINGS

FIG. 3 is a data configuration chart of schedule information;

DETAILED DESCRIPTION OF THE PREFERRED EMBODIMENTS

Figure 1:
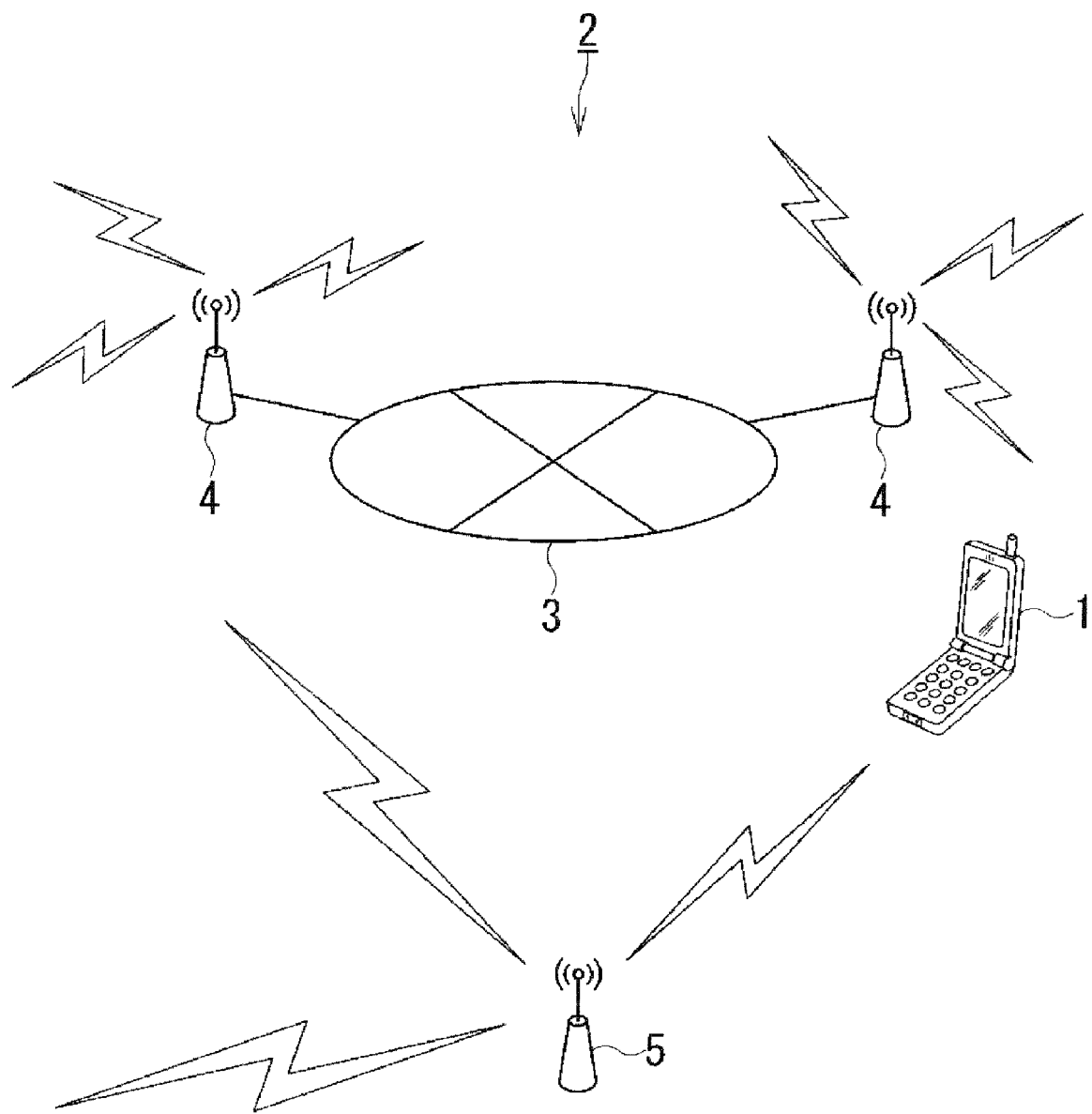
FIG. 1 is a system configuration view of a network system to which a communication apparatus according to an embodiment is applied.

Embodiments of a communication apparatus according to the invention will be explained with reference to the attached drawings. FIG. 1 is a system configuration view showing a network system 2 to which a communication apparatus 1 according to the embodiment is applied. As shown in FIG. 1, the network system 2 includes a network 3. The network 3 is, for example, a communication apparatus network, in which plural base stations 4 which are fixed wireless stations are set through wired cables in a communication service providing area of the communication apparatus 1. The communication apparatus 1 which is a mobile wireless station is wireless-connected to the base stations 4 by, for example, a code division multiple access system called as a W-CDMA (Wideband-Code Division Multiple Access) system, performing voice calls or data communication with other communication apparatus through the base stations 4.

In addition, in the network system 2, there is a GPS broadcasting station 5 of a GPS (Global Positioning System) which calculates latitude, longitude, altitude and the like of a present location by measuring positional relationship between a receiver and a satellite. The communication apparatus 1 acquires GPS information which is information of latitude, longitude, altitude and the like indicating a present location of the communication apparatus 1 by receiving radio waves broadcasted from the GPS broadcasting station 5.

Figure 2:
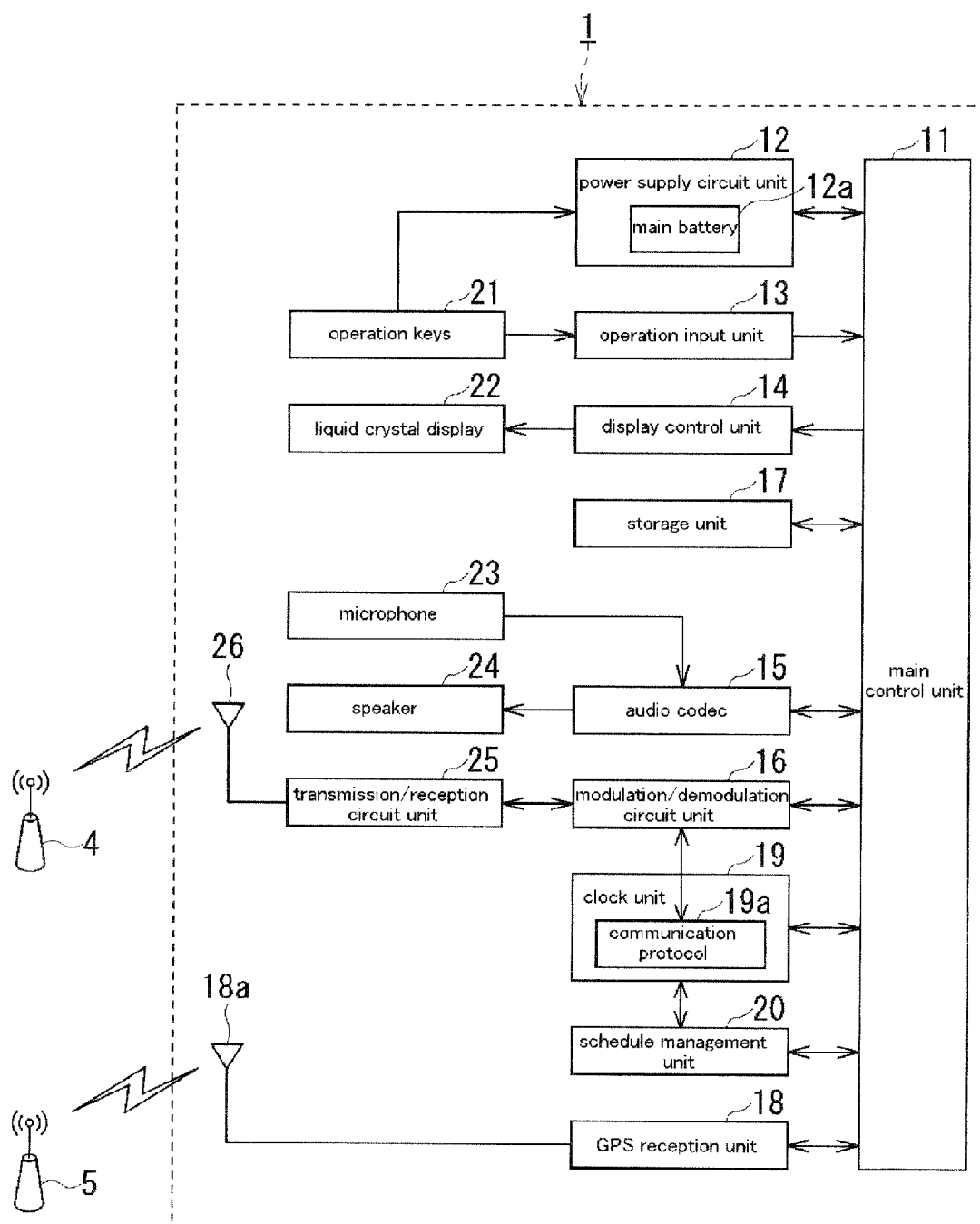
FIG. 2 is a functional block diagram of a communication apparatus according to the embodiment.

FIG. 2 is a functional block diagram of the communication apparatus 1 according to the embodiment. As shown in FIG. 2, the communication apparatus 1 includes a main control unit 11, a power supply circuit unit 12, an operation input control unit 13, a display control unit 14, an audio codec 15, a modulation/demodulation circuit unit 16, a storage unit 17, a clock unit 19, a schedule management unit 20 and a (PS reception unit 18, which are connected to one another by a bus.

The main control unit 11 has a CPU (Central Processing Unit), performing overall control as well as various computing processing, control processing and the like of the communication apparatus 1. The power supply circuit unit 12 switches the ON/OFF state of the power based on input through operation keys 21 by the user, supplying power to respective units from an internal power supply source when the power is on to allow the communication apparatus 1 to be operative. The power supply circuit unit 12 includes a main battery 12a which is removable as a power supply source.

The operation input control unit 13 includes an input interface with respect to the operation keys 21, transmitting data inputted by the operation keys 21 to the main control unit 11. The display control unit 14 has a display interface with respect to a liquid crystal display 22, performing processing of displaying document data, image data and the like on the liquid crystal display 22 based on control of the main control unit 11.

The communication apparatus 1 performs voice call processing with other communication apparatus, for example, through the base stations 4. That is, the audio codec 15 generates an analog voice signal from voice collected by a microphone 23 based on control of the main control unit 11. When the analog signal is inputted from the audio codec 15 at the time of the voice call, the modulation/demodulation circuit unit 16 converts the signal into a digital signal and transmits the signal to the a transmission/reception circuit unit 25. The transmission/reception circuit unit 25 transmits the digital voice signal to the base station 4 (network 3) through an antenna 26.

The modulation/demodulation circuit unit 16 converts the digital voice signal received by the transmission/reception circuit unit 25 from the base station 4 (the first network 3) through the antenna 26 into an analog voice signal. The audio codec 15 acquires the analog voice signal from the modulation/demodulation circuit unit 16 and outputs the signal from a speaker 24 as voice at the time of the voice call.

The communication apparatus 1 performs data communication processing with respect to other communication apparatus or communication equipment. That is, the communication apparatus 1 performs transmission and reception processing of various data such as e-mails, web-access data, image data, and video data. When the main control unit 11 receives data, the modulation/demodulation circuit unit 16 performs spectrum inverse-spread processing with respect to a reception signal received by the transmission and reception circuit unit 25 from the base station 4 (network 3) through the antenna 26 to restore data. The data is displayed on the liquid crystal display 22 through the display control unit 14 by the instruction of the main control unit 11 or stored in the storage unit 17.

When the main control unit 11 transmits data inputted through the operation input unit 13 or data stored in the storage unit 17, the modulation/demodulation circuit unit 16 performs spectrum spread processing with respect to data and the transmission/reception circuit unit 25 transmits data to the base station 4 (network 3) through the antenna 26.

The storage unit 17 includes a ROM (Read Only Memory) storing processing programs for processing performed by the main control unit 11 or data necessary for the processing, etc., a hard disk, a nonvolatile semiconductor memory, a RAM (Random Access Memory) temporarily storing data used when the main control unit 11 performs processing, and the like. Processing programs when performing time management processing or schedule management processing described later are stored in, for example, the ROM.

The storage unit 17 stores schedule information 30 for performing schedule management by the schedule management unit 20. The schedule information 30 is information for notifying the user of designated times of schedules registered by the user. As shown in FIG. 3, the schedule information 30 includes item information 31 indicating item names of schedules, designated time information 32 indicating start time of schedules, alarm information 33 indicating whether an alarm is sounded at start time of the schedule or not, display content information 34 indicating the contents displayed at start time of schedules, a sound information 35 indicating the kinds of sounds to be generated at start time of schedules and execution status information 3 indicating whether notification has been done or not.

The alarm information 33 is indicated by, for example, "ON" when an alarm is sounded at the designated time and "OFF" when the alarm is not sounded. The display content information 34 is indicated by character strings inputted by the user or images designated by the user. The sound information 35 indicates information concerning sounds generated as alarm sounds when the alarm information 33 is "ON" by tune titles and the like. The execution status information 36 is indicated by, for example, "done" when notification has already been performed or indicated by "undone" when notification has not been performed yet. The item information 31 to the sound information 35 are inputted by, for example, the user through the operation keys 21, and the execution status information 36 is set by the schedule management unit 20.

In the schedule information 30 shown in FIG. 3, for example, a schedule concerning "wake-up" is set so that a character string "Good morning" is displayed at the designated time "6:00" and so that an alarm sound is sounded using a tune of "Ninth Symphony", and the fact that the processing has been already performed is indicated. A schedule concerning "lunch" is set so that an image 1 is displayed at the designated time "12:00" and so that an alarm sound is sounded using an alarm 1, and the fact that the processing has not been performed yet is indicated.

The GPS reception unit 18 includes an antenna 18a receiving radio waves broadcasted from the GPS base station 5, acquiring GPS information indicating a current location of the communication apparatus 1 based on the radio waves to transmit the information to the main control unit 11 or the clock unit 19. The GPS information includes information indicating the current time.

The clock unit 19 includes an internal clock clocking time by using a RTC (Real Time Clock) circuit, which clocks the current time by the power supplied by the power supply circuit unit 12 when the power is ON. The RTC circuit is a chip which is dedicated for clocking, operating by receiving power supply from the main battery 12a even when the power is OFF as long as the main battery 12a is connected. The clock unit 19 also includes a communication protocol 19a in which a communication procedure is written, and the accurate current time can be acquired from the base station 4 or the GPS broadcasting station 5 by activating the communication protocol 19a. For example, the accurate current time information from the base station 4 is latter steps. The accurate current time information is received by once switching the receiving channel from the paging channel to the sync-channel, receiving a sync-channel signal transmitted from the base station, and extracting system time information from the received sync-channel signal.

The schedule management unit 20 performs schedule management processing such that the content of a schedule is displayed or an alarm is sounded at the designated time based on the current time clocked by the clock unit 19 and the schedule information 30 stored in the storage unit 17. Since the schedule management processing is operated based on the current time, it is necessary to acquire the accurate current time from the clock unit 19 when performing the schedule management processing.

The communication apparatus 1 includes the main battery 12a as the power supply source of the power supply circuit unit 12, however, it does not include a sub battery which is another power supply source. In the conventional communication apparatus having only one power supply source, the clock unit including the internal clock operates by using the power supplied from the power supply source. Therefore, when the main battery is removed, it is unable that the clock unit clocks the accurate current time, and the current time is initialized. In the case that the main battery is connected to the conventional communication apparatus again, the clock unit is allowed to operated again, however, it is unable to set the current time again and the initialized state is continued because the accurate current time is unclear. Therefore, in the conventional communication apparatus, it is unable to perform the schedule management processing as it is unable to keep the accurate current time during the power is OFF.

Accordingly, the communication apparatus 1 according to the present embodiment, when the main battery 12a is connected again after it was removed once, acquires the accurate current time from the base station 4 or the GPS broadcasting station 5 and set the current time again by immediately activating the communication protocol 19a regardless of the ON/OFF state of the power. According to this, the communication apparatus 1 is capable of performing services such as the schedule management processing which use the time even when the power is OFF because the clock unit 19 can clock the accurate current time regardless of the ON/OFF state of the power even after the main battery 12a was removed and attached.

Figure 4:
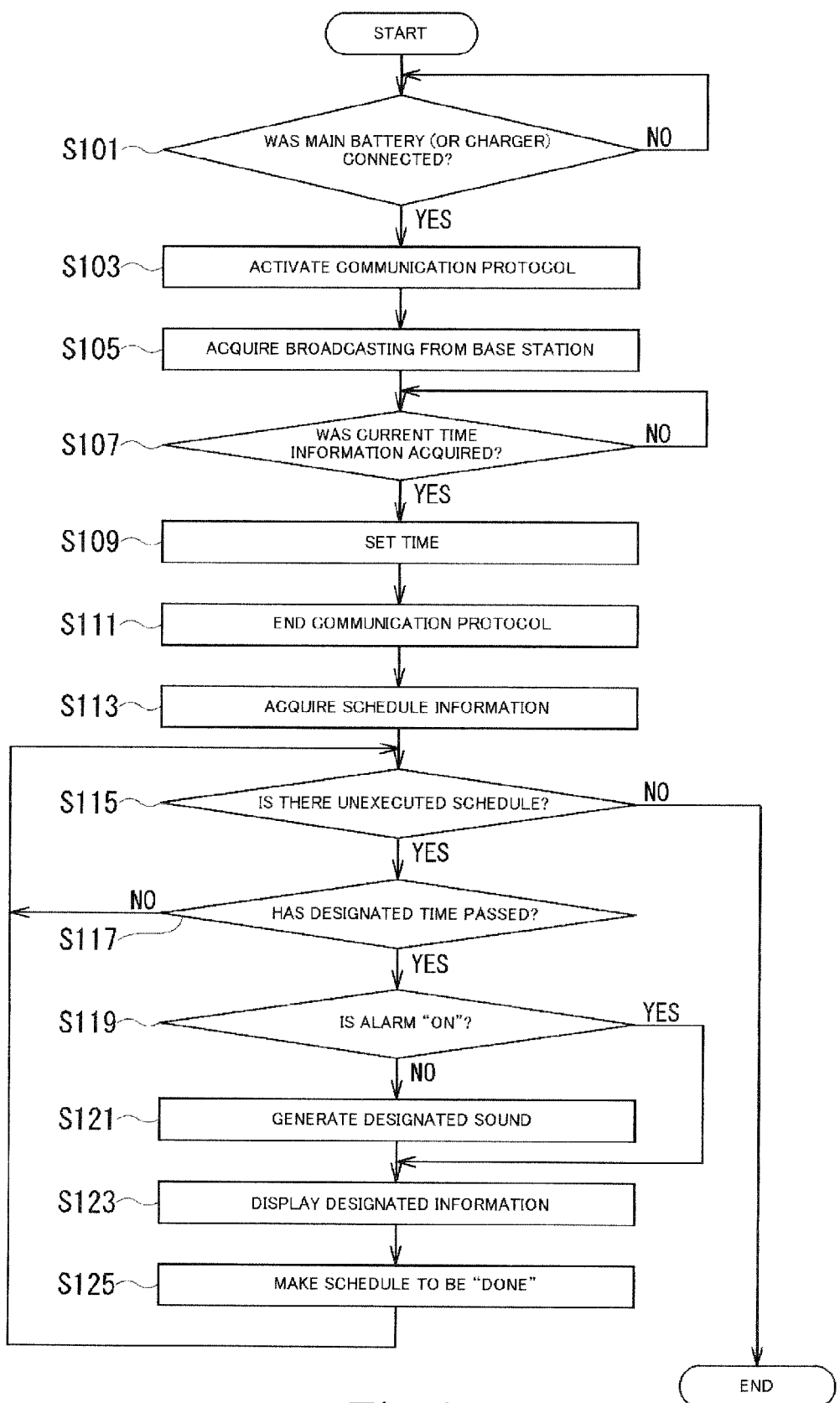
FIG. 4 is a flowchart showing procedures when a communication apparatus according to the embodiment performs current time setting processing.
Figure 5:
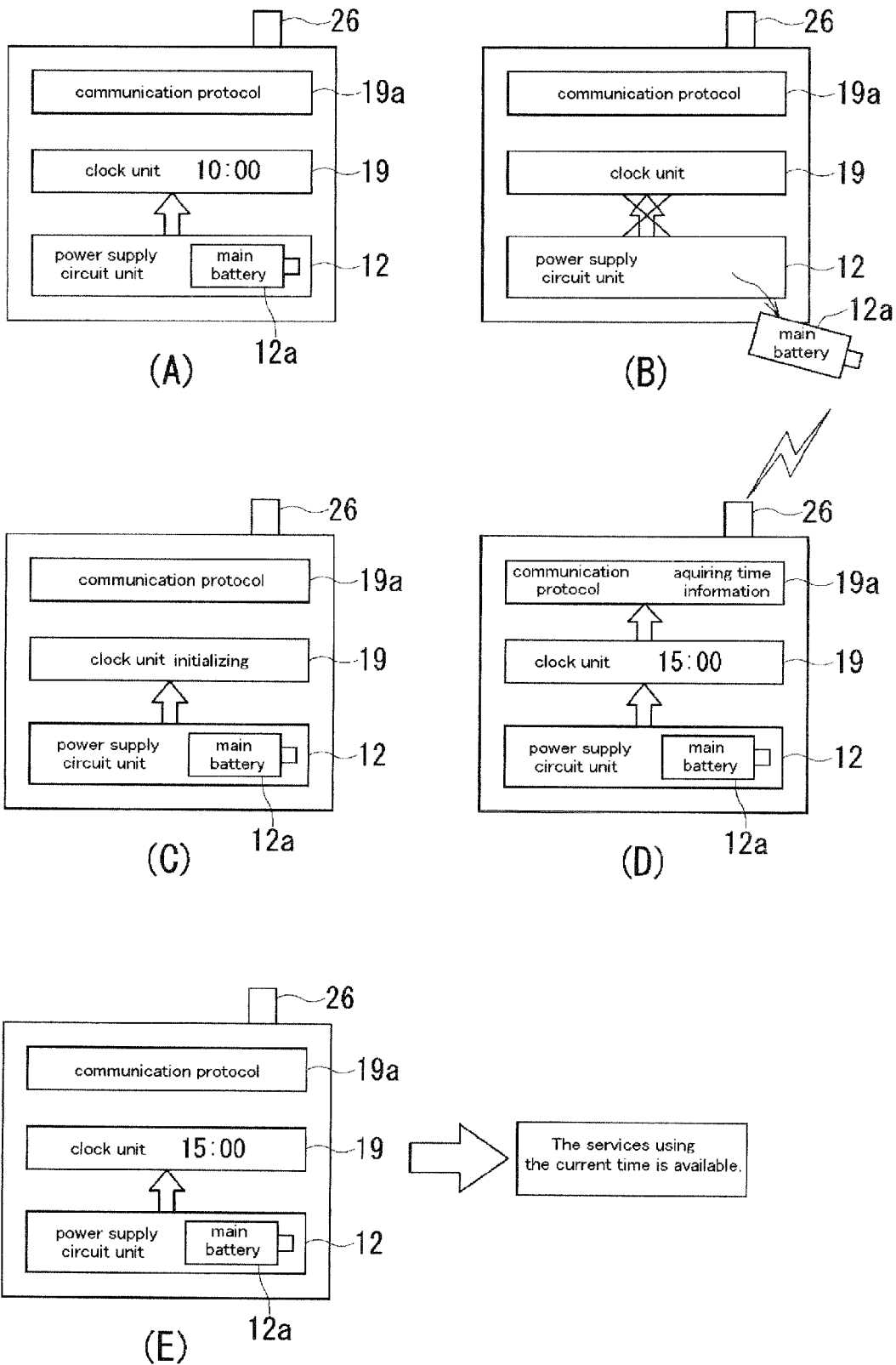
FIG. 5A to FIG. 5E are diagrams for explaining current time setting processing by a communication apparatus according to the embodiment.

A procedure in which the clock unit 19 of the communication apparatus 1 performs the current time management processing when the main battery 12a which was removed once is connected to the communication apparatus 1 again will be explained based on a flowchart shown in FIG. 4 and explanatory diagrams shown in FIG. 5. Assume that the main battery 12a is removed from the communication apparatus 1 at first. In the following description, a word "step" will be omitted in such a manner that "Step S101" is expressed by "S101".

First, the communication apparatus 1 clocks the current time by the RTC circuit of the clock unit 19, receiving power supply from the main battery 12a connected to the power supply circuit 12 as shown in FIG. 5A. As shown in FIG. 5B, when the main battery 12a is removed in the communication apparatus 1, the power is not supplied to the RTC circuit included in the clock unit 19, therefore, the clock unit 19 is unable to clock the current time. As shown in FIG. 5C, in the case that the main battery 12a is connected to the communication apparatus 1 again, when the power is supplied from the main battery 12a and the RTC circuit starts operating again, the time only passes at the clock unit 19 and it is unable to clock the accurate current time because the current time has been already inaccurate.

Accordingly, it is necessary that the clock unit 19 initializes the current time once and newly sets the accurate current time when the main battery 12a is connected. First, the clock unit 19 judges whether the main battery 12a was connected to the communication apparatus 1 or not (S101). When the main battery 12a was not connected (No in S101), the clock unit 19 is in a stand-by state.

As shown in FIG. 5D, when the main battery 12a is connected to the communication apparatus 1 (Yes in S101), the clock unit 19 activates the communication protocol 19a (S103). In the communication protocol 19a, a procedure for acquiring the accurate current time information and set the time in the clock unit 19 is described. The clock unit 19 activates the communication protocol to acquire radio waves, for example, broadcasted by the base station 4 through the antenna 26 (S105). The radio waves broadcasted from the base station 4 includes time information indicating the current time.

The base station 4 broadcasts system time information indicating the accurate current time at any time, and the communication apparatus 1 receives the system time information through the antenna 26, setting the time as the current time. The time information acquired by the communication apparatus 1 is not limited to the time information broadcasted by the base station 4 and it is also preferable that the communication apparatus 1 acquires information of current time broadcasted by the GPS broadcasting station 5, which is received by the GPS reception unit 18.

The clock unit 19 judges whether the current time information was acquired or not (S107). When the current time information was not acquired (No in S107), the clock unit 19 remains stand by. When the current time information was acquired (Yes of S107), the clock unit 19 synchronizes the current time information acquired in S107 with the RTC circuit to set the current time (S109). Accordingly, time clocked by the RTC circuit is set to the accurate current time. The clock unit 19 ends the communication protocol when the current time is set in S109 (S111).

The processing from Step S101 to S111 is performed while the power is OFF. Accordingly, even in the case that the current time of the internal clock of the communication apparatus 1 is inaccurate because the power is not supplied to the communication apparatus 1, it is possible to set the accurate current time while the power is OFF even when the power is not turned on.

When the current time is set by the clock unit 19, the schedule management unit 20 can perform the schedule management based on the accurate current time set in S109 as shown in FIG. 5E. At this time, when services using the current time were set in the communication apparatus 1 in a period from the main battery 12a was removed until it is connected to the communication apparatus 1, there is a possibility that the services have not been executed and remain. Therefore, the schedule management unit 20 acquires the schedule information 30 from the storage unit 12 (S113).

In addition, there is a possibility that processing of schedules supposed to be executed in a period during which the main battery 12a was removed from the communication apparatus 1 has not been executed. In consideration of this, the schedule management unit 20 judges whether there is an unexecuted schedule or not based on the schedule information 30 (S115). Here, the schedule management unit 20 judges, for example, whether there is an item indicated by "undone" in the execution status information 36 from the schedule information 30.

When there is an unexecuted schedule (Yes in S115), the schedule management unit 20 judges whether the designated time of the unexecuted schedule has passed or not (S117). That is, the schedule management unit 20 judges whether the time shown in the designated time information 32 of the schedule information 30 is prior to the current time or not. That is because, when there is an unexecuted schedule whose designated time has passed, it is necessary to notify the fact to the user.

When the designated time of the unexecuted schedule has passed (Yes in S117), the schedule management unit 20 judges whether the alarm of the schedule is in the "ON" state or not (S119). That is, the schedule management unit 20 judges whether the alarm information 33 of the schedule is in the state of "ON" or not. When the alarm is in the state of "ON" (Yes in S119), the schedule management unit 20 instructs the audio codec 15 to generate the sound designated by the sound information 35 through the speaker 24 (S121).

The schedule management unit 20 instructs the display control unit 14 to display the display content shown in the display content information 34 through the liquid crystal display 22 (S123). Since the schedule management unit 20 performs processing of notifying the user about the schedule, the execution status information 36 is made to be "done" (S125).

The schedule management unit 20 returns to S115, judging whether there is another unexecuted schedule or not. When there is the unexecuted schedule, the processing from S117 to S125 is performed again. When there is not another unexecuted schedule (No of S115), the current Lime management processing ends.

The processing performed by the schedule management unit 20 when the main battery 12a is connected to the communication apparatus 1 will be explained, assuming that the main battery 12a was removed at "10:00" and connected at "15:00" again, as shown in, for example, FIG. 5. In this case, the power was not supplied to the communication apparatus 1 from 10:00 to 15:00. Therefore, in the schedule information 30, the processing concerning the schedule "wake-up" whose designated time is "6:00" has been already executed, however, the schedule "lunch" whose designated time is "12:00" and the schedule "meeting" whose designated time is "13:30" have not been executed through the designated times have passed.

Figure 6:
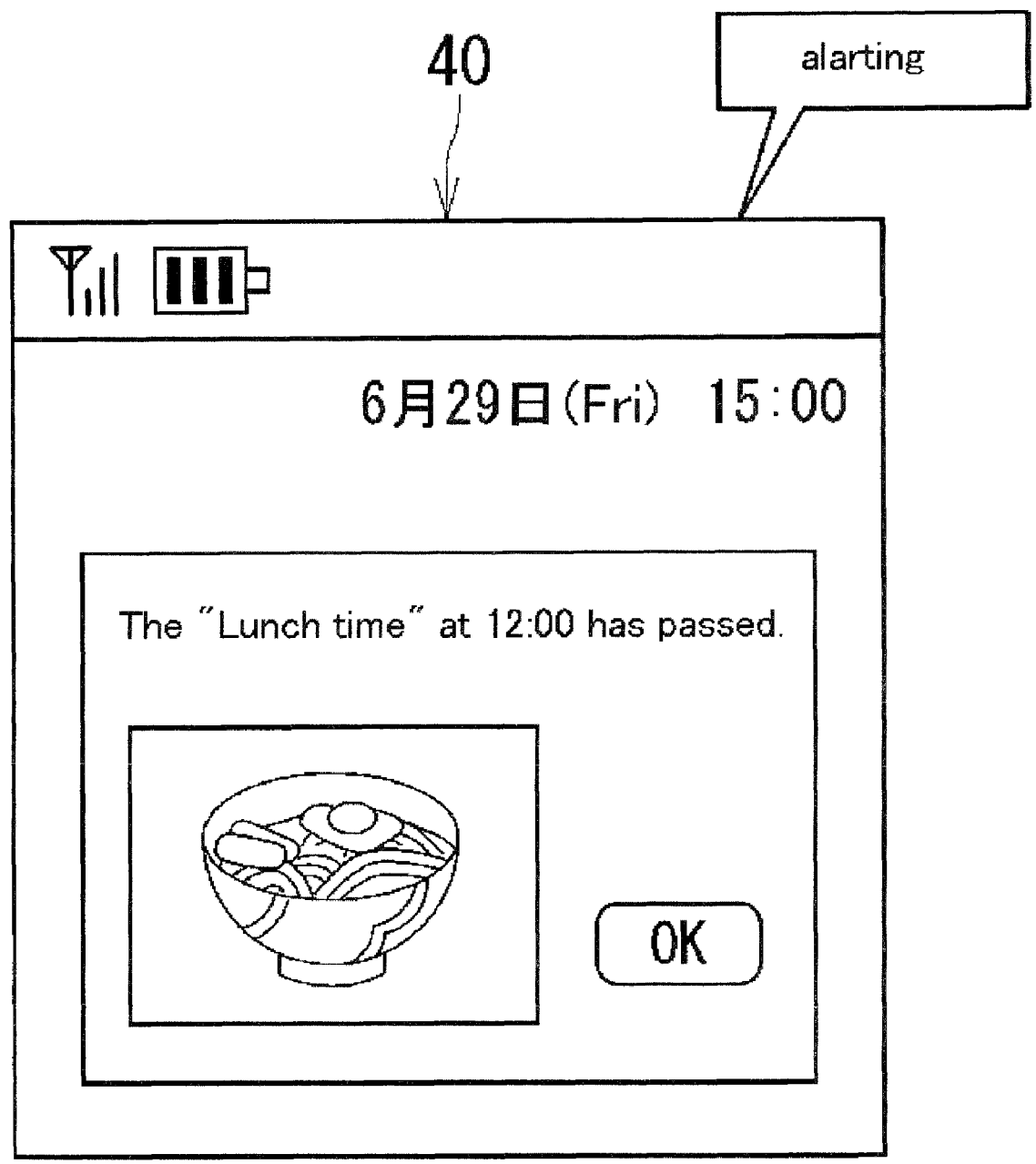
FIG. 6 is a screen view when the current time setting processing is performed by a communication apparatus according to the embodiment.

The schedule "lunch" will be explained. Since the execution status information 36 is "undone" in S115, the process proceeds to Yes. The designated time information is "12:00" and the current time is "15:00", namely, the designated time has passed, therefore, the process proceeds to Yes in S117. Since the alarm information 33 is "ON", the process proceeds to Yes in S119, and the sound of the alarm 1 is generated as an alarm sound based on the sound information "alarm 1". In S123, a display screen 40 is displayed on the liquid crystal display 22 based on "image 1" of the display content information 34 as shown in FIG. 6. In the display screen 40, the fact indicating that the designated time of the schedule "lunch" has passed and the image 1 designated in the display content information 34 are displayed.

Figure 7:
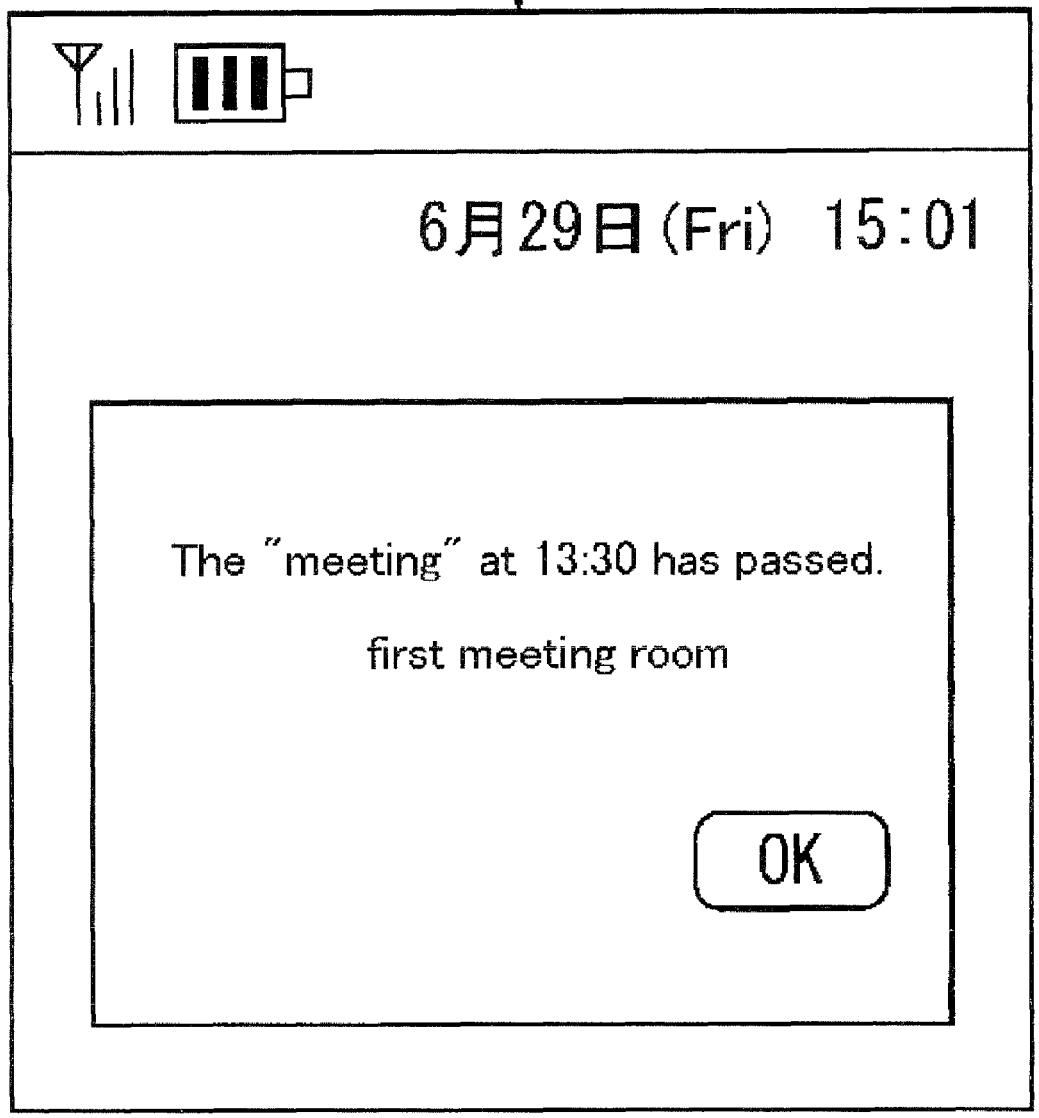
FIG. 7 is a screen view when the current time setting processing is performed by a communication apparatus according to the embodiment.

The schedule "meeting" will be explained. Since the execution status information 36 is "undone" in S115, the process proceeds to Yes. The designated time information "13:30" and the current time is "15:00", namely, the designated time has passed, therefore, the process proceeds to Yes in S117. Since the alarm information 33 is "OFF", the process proceeds to No in S119. In S123, as shown in FIG. 7, a display screen 41 is displayed on the liquid crystal display 22 based on "First meeting room! !" in the display content information 34. In the display screen 41, the fact indicating that the designated time of the schedule "meeting" has passed and "First meeting room!!" which is a character string designated by the display content information 34 are displayed.

The above-mentioned time management processing from Step S101 to S111 and the schedule management processing from Step S115 to S125 are performed regardless of the ON/OFF state of the power, therefore, even in the case that the battery is removed and the power of the communication apparatus 1 is OFF, the accurate current time is kept, and the schedule management processing is performed based on the accurate current time. In the case that it is necessary that the power is turned on when the schedule management processing is performed, the schedule management unit 20 sets the power of the communication apparatus 1 to the ON state based on the designated time of the schedule.

As described above, when the current time clocked by the RTC circuit is initialized because the main battery 12a which is the only power supply source was removed once, the communication apparatus 1 acquires the accurate current time from the base station 4 or the GPS broadcasting station 5 by immediately activating the communication protocol 19a by the clock unit 19 and set the time in the RTC circuit again when the main battery 12a is connected again, thereby performing services using time such as schedule management processing.

The clock unit 19 performs the processing from Step S101 to S111 while the power is OFF, therefore, even when the user who had set the alarm function or the like in the communication apparatus 1 sets the main battery 12a to the communication apparatus 1 anew and has a sleep in that state, the current time is set again while the power is OFF and the alarm can be sounded at the time as scheduled.

Figure 8:
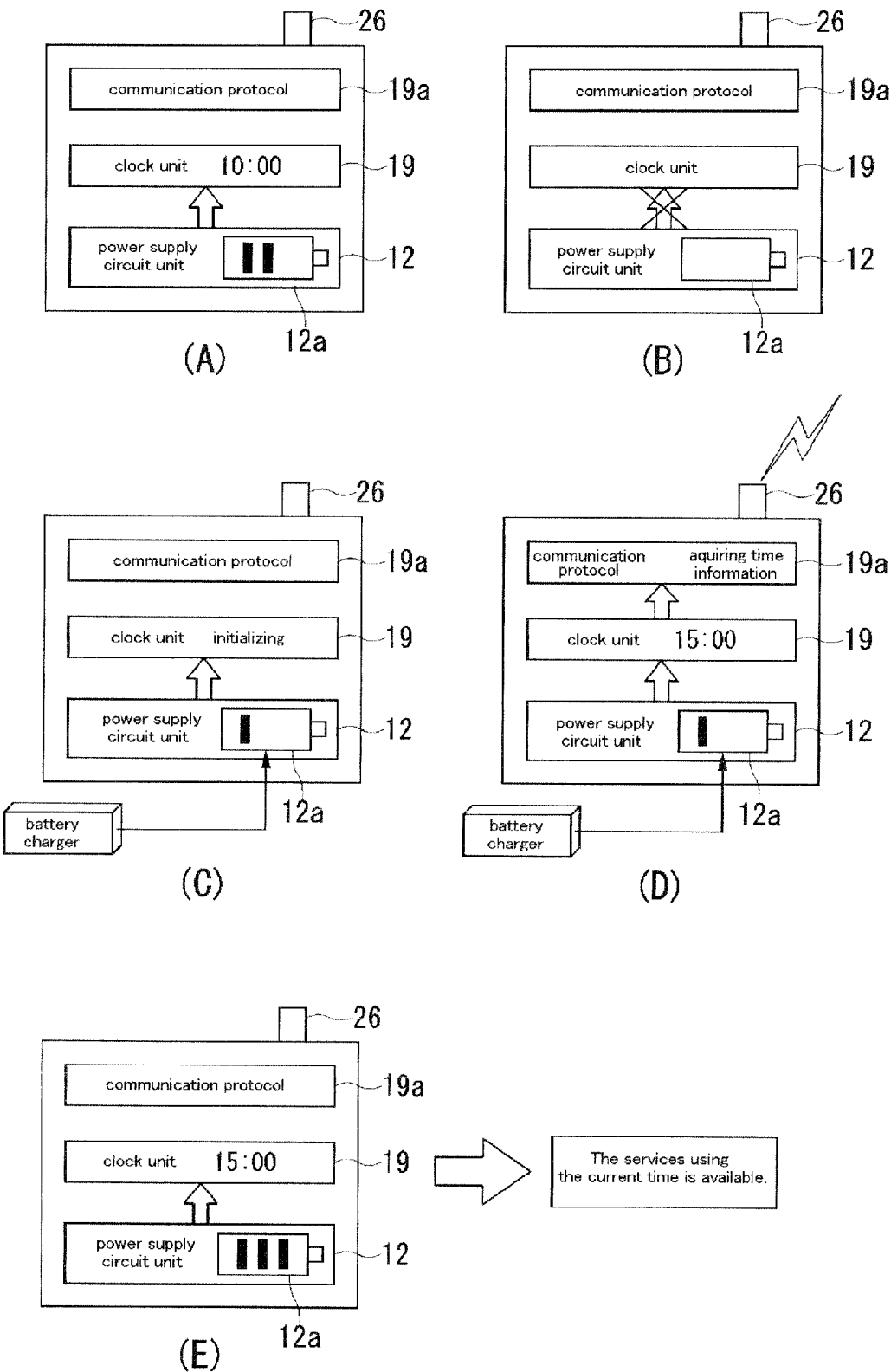
FIG. 8A to FIG. 8E are diagrams for explaining current time setting processing by a communication apparatus according to the embodiment.

When the communication apparatus 1 changes from the state in which the power is supplied from the main battery 12a connected to the power supply circuit 12 and the RTC circuit in the clock unit 19 clocks the current time as shown in FIG. 8A to the state in which the power supply is cut due to low voltage of the main battery 12a as shown in FIG. 8B, the clock unit 19 is unable to clock the current time because the power is not supplied to the RTC circuit included in the clock unit 19. When the main battery 12a is charged by connecting a charger to the power supply circuit 12 of the communication apparatus 1 as shown in FIG. 8C, the power is supplied from the main battery 12a to the RTC circuit and the RTC circuit starts operating again. However, the current time has already been inaccurate, the time only passes in the clock unit 19 and the clock unit 19 is unable to clock the accurate current time in the same way as the case in which the main battery is removed in FIG. 5.

Also in the case that the power supply is cut due to low voltage of the main battery 12a, the above processing from Step S101 to S125 is performed in the communication apparatus 1 in the same manner. Accordingly, when the main battery 12a is connected again in the case that the current time clocked by the RTC circuit was initialized because the power supply was cut due to low voltage of the main battery 12a which is the only power supply source, the clock unit 19 immediately activates the communication protocol 19a, acquiring the accurate current time from the base station 4 or the GPS broadcasting station 5 and setting the time in the RTC circuit, thereby performing services using time such as the schedule management processing as shown in FIGS. 8D and 8E.

The example in which the processing of notifying the user of the schedule by the alarm or display at the time designated by the schedule information 30 has been explained as an embodiment, however, the processing is not limited to this, and other various processing can be performed such as execution of a designated application program or recording of terrestrial digital broadcasting. For example, in the case that the application program which had been set to be executed at a designated time was not executed because the power had not been supplied due to the removal of the main battery 12a or other reasons, the communication apparatus 1 may perform display for prompting instruction whether the application program should be executed or not.

In the communication apparatus 1 according to the invention, when the main battery is connected or the main battery is charged even in the case that the main battery was removed or the power supply was cut due to low voltage of the main battery, the accurate current time can be immediately set again regardless of the ON/OFF state of the power, as a result, services using time can be performed after the main battery was removed and mounted.

As description of the invention, the communication apparatus 1 has been explained, however, this invention is not limited to this, and can be applied to an optional information processing terminal as long as it is an information processing terminal which clocks time by an internal clock such as a PHS (Personal Handy-phone System), a PDA (Personal Digital Assistant), a notebook PC (Personal Computer) a portable game device.

What is claimed is:

1. A communication apparatus having a main battery for performing main operations of the communication apparatus so as to connect or remove from the device freely, comprising:
a clock unit configured to count a current time by using power supplied by the main battery,
an acquiring part configured to acquire the current time included in information received from a GPS base station in response to reconnection of the main battery after removal even if a status of a power supply is OFF, and
a control unit configured to set the current time acquired by the acquiring part as the current time counted.

2. The communication apparatus according to claim 1, wherein
the clock unit is not capable of counting the current time if the battery is not connected to the communication apparatus.

3. The communication apparatus according to claim 2, wherein
the clock unit is configured to count the current time and the acquiring part is configured to acquire the current time, even if the main battery is connected to the communication apparatus, and
the control unit is configured to set even if the status of the power supply is ON or OFF.

4. The communication apparatus according to claim 1, further comprising:
a storage unit configured to store a schedule information, the schedule information including a designated time information of the schedule, a content information indicating a content displayed at the designated time of schedule, and an execution status information indicating whether notification has been done or not, and wherein
the control unit controls to, if the control unit sets the current time and if the control unit detects not to inform the content information despite passing the designated time, inform the content information passing the designated time.

5. The communication apparatus according to claim 2, further comprising:
a storage unit configured to store a schedule information, the schedule information including a designated time information of the schedule, a content information indicating a content displayed at the designated time of schedule, and an execution status information indicating whether notification has been done or not, and wherein
the control unit controls to, if the control unit sets the current time and if the control unit detects not to inform the content information despite passing the designated time, inform the content information corresponding to the designated time passed.

6. The communication apparatus according to claim 4, wherein, the control unit informs the content information with alarm.

7. The communication apparatus according to claim 5, wherein, the control unit informs the content information with alarm.

8. A communication apparatus having a rechargeable main battery for performing main operations of the communication apparatus so as to connect or remove from the device freely, comprising:
a clock unit configured to count a current time by using power supplied by the rechargeable main battery,
an acquiring part configured to acquire the current time included in information received from a GPS base station in response to starting of a charging of the rechargeable main battery after a power cutoff caused by a low power level of the rechargeable main battery even if a status of a power supply is OFF, and
a control unit configured to set the current time acquired by the acquiring part as the current time counted.

9. The communication apparatus according to claim 8, wherein
the clock unit is not capable of counting the current time if the battery is not connected to the communication apparatus.

10. The communication apparatus according to claim 9, wherein
the clock unit is configured to count the current time and the acquiring part is configured to acquire the current time, even if the rechargeable main battery is connected to
the communication apparatus, and
the control unit configured to set even if the status of the power supply is ON or OFF.

11. The communication apparatus according to claim 8, further comprising:
a storage unit configured to store a schedule information, the schedule information including a designated time information of the schedule, a content information indicating a content displayed at the designated time of schedule, and an execution status information indicating whether notification has been done or not, and wherein
the control unit controls to, if the control unit sets the current time and if the control unit detects not to inform the content information despite passing the designated time, inform the content information passing the designated time.

12. The communication apparatus according to claim 9, further comprising:
a storage unit configured to store a schedule information, the schedule information including a designated time information of the schedule, a content information indicating a content displayed at the designated time of schedule, and an execution status information indicating whether notification has been done or not, and wherein
the control unit controls to, if the control unit sets the current time and if the control unit detects not to inform the content information despite passing the designated time, inform the content information corresponding to the designated time passed.

13. The communication apparatus according to claim 11, wherein, the control unit informs the content information with alarm.

14. The communication apparatus according to claim 12, wherein, the control unit informs the content information with alarm.

* * * * *